United States Patent [19]
Hiltebrand

[11] Patent Number: 4,826,133
[45] Date of Patent: May 2, 1989

[54] SEAL ARRANGEMENT FOR FLAP VALVE

[75] Inventor: Eduard Hiltebrand, Schaffhausen, Switzerland

[73] Assignee: Georg Fischer AG, Schaffhausen, Switzerland

[21] Appl. No.: 229,134

[22] Filed: Aug. 5, 1988

[30] Foreign Application Priority Data

Aug. 17, 1987 [CH] Switzerland ............... 03156/87

[51] Int. Cl.⁴ ............................................. F16K 1/228
[52] U.S. Cl. ..................................... 251/306; 251/305
[58] Field of Search .................. 251/173, 305, 306; 137/375

[56] References Cited

U.S. PATENT DOCUMENTS

| | | | |
|---|---|---|---|
| 2,488,380 | 11/1949 | Banks | 251/173 |
| 4,083,529 | 4/1978 | Sarty et al. | 251/173 X |
| 4,540,457 | 9/1985 | La Valley | 251/305 X |

FOREIGN PATENT DOCUMENTS

| | | | |
|---|---|---|---|
| 232814 | 8/1963 | Austria | 251/306 |
| 1500181 | 10/1969 | Fed. Rep. of Germany | 251/173 |
| 3104211 | 12/1981 | Fed. Rep. of Germany | |
| 2069103 | 8/1981 | United Kingdom | |

Primary Examiner—A. Michael Chambers
Assistant Examiner—John C. Fox
Attorney, Agent, or Firm—Toren, McGeady & Associates

[57] ABSTRACT

In a flap valve, a casing is provided forming a flow opening through the valve. A flap is pivotally mounted in the casing for closing the flow opening. The casing is formed of two annular parts secured together by bolts. The two casing parts have a plane of contact with a seal secured between the two parts and extending around the opening in the plane of contact. The seal includes a pair of spaced rings with arcuately shaped seal members extending between and interconnecting the rings. Each seal member has an circumferentially extending closed hollow space forming an air cushion. When the flap is placed in the closed position in the flow opening, a slight torsional moment is executed against the seal which is formed of a wear-resistant material so that a good sealing effect is obtained.

12 Claims, 3 Drawing Sheets

SEAL ARRANGEMENT FOR FLAP VALVE

BACKGROUND OF THE INVENTION

The present invention is directed to a flap valve with a flap pivotally mounted within an annular casing. The casing forms an opening for passage of a fluid through the valve. The casing is made up of two annular casing parts in contacting engagement with the plane of contact between them extending transversely of the axis of the opening through the valve. An annular seal is mounted in a slot formed by the two casing parts at the plane of contact.

In the patent publication DE-A1-No. 31 042 11, a similar flap valve is disclosed with the seal including arcuately extending seal members with a solid rectangular cross-section.

To obtain an effective seal and low torsional moment forces with the flap, the seal must be sufficiently flexible, that is, it must be formed of a soft sealing material and, as a result, is not wear-resistant. Such a sealing material is exposed to wear due to contact with the flap.

SUMMARY OF THE INVENTION

Therefore, it is the primary object of the present invention to provide a flap valve of the above type with a seal which assures satisfactory sealing of the opening of the flow passage through the valve when the flap is closed with the seal being exposed to only slight wear. Further, the valve provides the required sealing effect even when connected to larger tubular members, for example, tubular members having a diameter exceeding 100 mm. When such larger valves are required, the flap must provide an adequate closure under the correspondingly high pressures experienced.

In accordance with the present invention, a seal is provided in the flap valve made up of two circumferentially extending sealing members mounted between the two casing parts with each sealing member forming a circumferentially extending closed hollow space.

Especially advantageous embodiments of the invention are set forth in the claims.

By providing a hollow space in the seal members extending in the circumferential direction, an effective seal is provided when the flap is moved into the closed position and a slight torsional moment is obtained even if the seal material is not resistant to wear.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
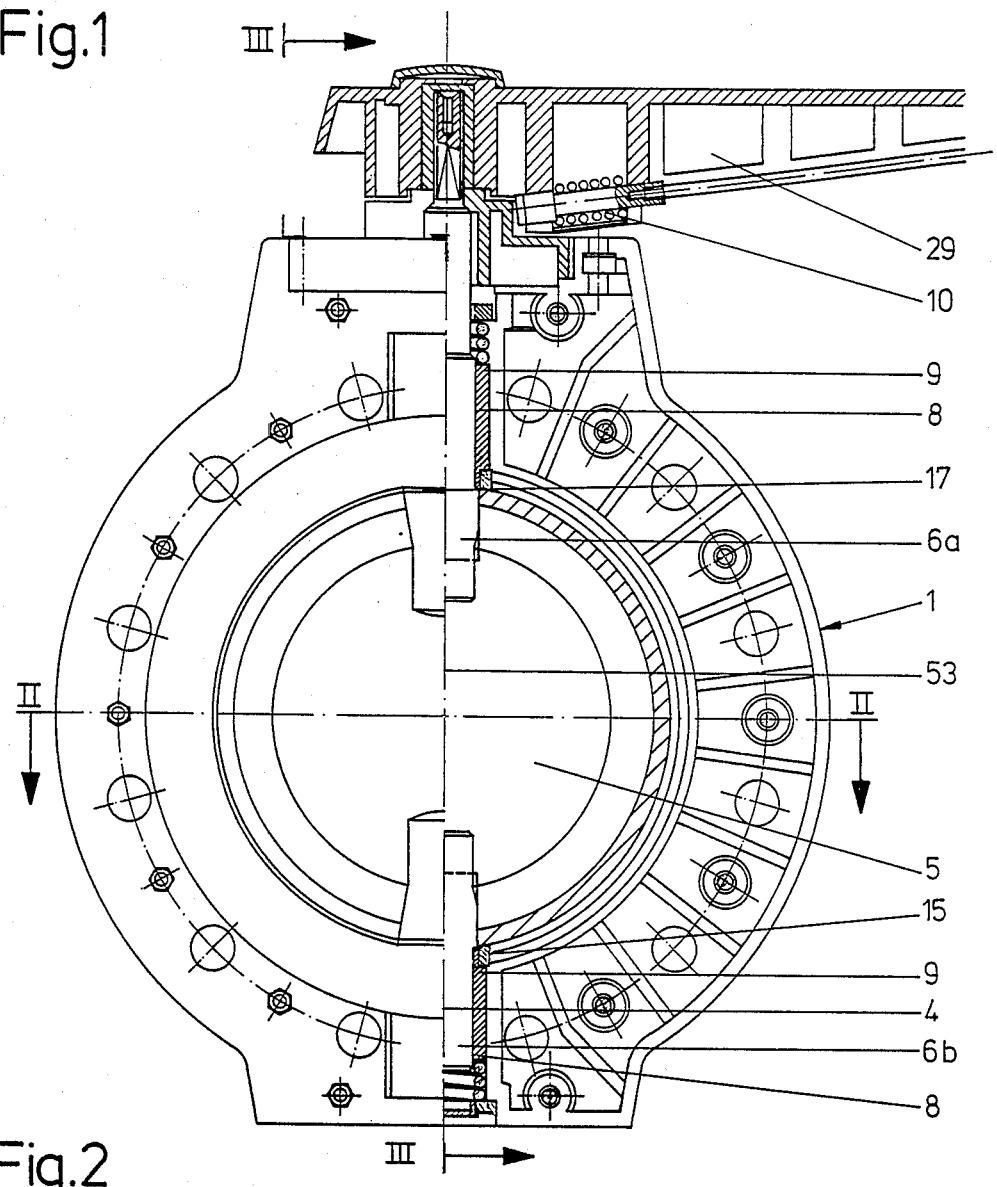
FIG. 1 is an elevational view, partly in cross-section, of a flap valve embodying the present invention.
Figure 2:
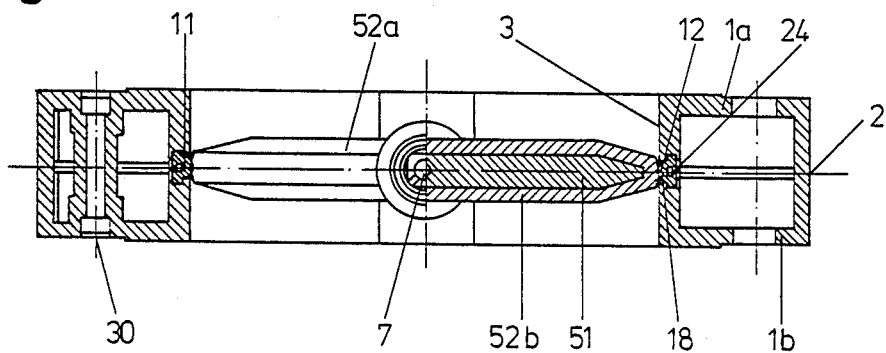
FIG. 2 is a view taken along the line II—II in FIG. 1.
Figure 3:
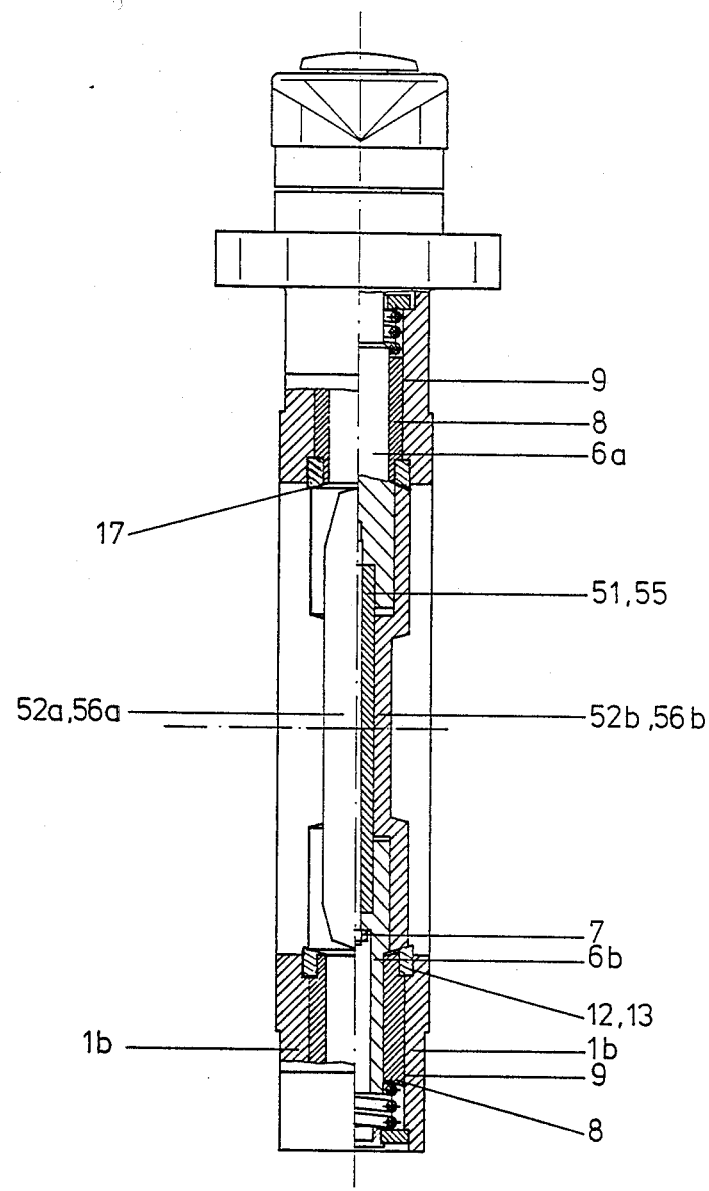
FIG. 3 is a cross-sectional view taken along the line III—III in FIG. 1.

In FIGS. 1 to 3, a flap valve is illustrated embodying the present invention and includes an annular casing 1 with an opening 3 forming a flow passage through the valve. The casing is formed of two annular casing parts or halves 1a, 1b, in side-by-side relation. The contacting surfaces of the two casing parts or halves 1a, 1b, form a plane of contact 2, extending across the opening 3, forming the flow passage through the valve. Further, the plane of contact 2 extends through and contains the pivot axis 4 of a flap 5 for closing the opening 3. Flap 5 has a metallic core 51, preferably formed of a rust-proof steel, with the core enclosed within a covering of two shell-shaped parts 52a, 52b made of synthetic plastics material. The shell-shaped parts 52a, 52b are welded to one another. Preferably, the shell-shaped parts 52a, 52b are butt welded together.

The plane of contact of the welding seam 53 connecting the two-shell parts 52a, 52b is located in a plane extending through the pivot axis 4, and transversely of the plane of contact 2 of the casing 1, when the sealing flap is in the closed position as displayed in FIG. 2. Accordingly, the welding seam 53 runs in the axial direction of and on opposite sides of the pivot axis 4. Pivot axis 4 includes two shaft sections 6a, 6b, each connected to the metallic core 51 by a threaded connection 7. As can be seen in FIG. 2, the two shaft sections 6a, 6b are in spaced opposed relationship extending into the flap from diametrically opposite sides. By means of the shaft section 6a, 6b, the flap 5 is rotatably or pivotally mounted in bushings 8. Bushings 8 are located in recesses 9 formed in the two casing parts 1a, 1b. Shaft section 6a projects out of the casing 1 on one side and a handle 29 with a retaining device 10 is secured onto the shaft section 6a, note FIG. 1. In place of the handle 29, an actuating drive can be connected with torsional strength to the shaft at the casing.

Figure 4:
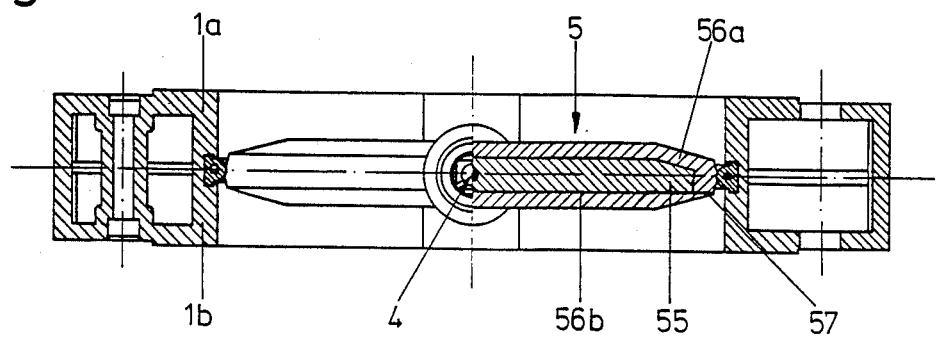
FIG. 4 is view similar to FIG. 2 illustrating another embodiment of the flap valve incorporating the present invention.

FIG. 4 shows another embodiment of the pivotal flap 5 with a metallic core 55 enclosed within a covering of two shell-shaped parts 56a, 56b made of synthetic plastics material. In this embodiment, the plane of contact 57 of the two shell-shaped parts 56a, 56b is offset from the pivot axis 4 in a plane extending through the pivotal flap so that in the closed position of the flap in the dowel, the plane of contact 57 of the shell-shaped parts is parallel to and spaced from the plane of contact 2 of the casing parts. The shell-shaped parts 56a, 56b are connected to one another by vibratory welding in the plane of contact 57, after the shell-shaped parts are placed on the metallic core 55.

The insertion and attachment of the two shaft sections 6a, 6b by a threaded connection 7 is carried out as described above for the first embodiment.

As can be noted in FIG. 2, the two casing parts or halves 1a, 1b combine to form an annular tee-slot 11 in the plane of contact 2. A seal 12 is placed in the tee-slot 11. As shown in FIGS. 5 to 8, seal 12 includes two rings 13, each located on a diametrically opposite side of the opening 3 through the casing with the rings being concentric to the swivel axis 4. The rings 13 are interconnected by means of two arcuately shaped circumferentially extending seal members 14. Accordingly, seal 12, made up of the two rings 13 and the two seal members 14, has an annular shape.

Figure 5:
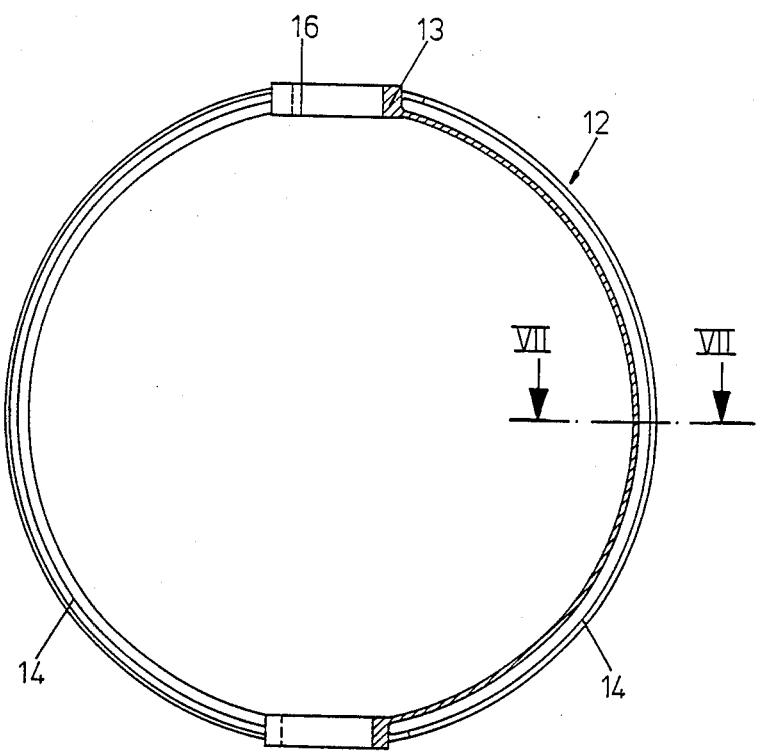
FIG. 5 is an elevational view, partly in section, of a seal for the flap valve.
Figure 6:
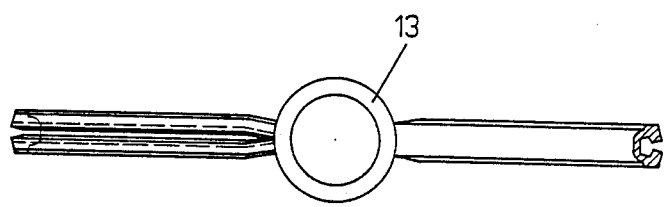
FIG. 6 is a top view of the seal shown in FIG. 5.

Seal 12 is formed monolithically of an elastomer which is resistant to abrasion and is also resistant to most of the media to be passed through the valve. Rings 13 are located in recesses 15 formed by the two casing parts 1a, 1b, and, as viewed in FIG. 5, provide a rectangular cross-section with a conical or spherically shaped sealing surface 16 facing inwardly toward the axis of the opening 3. The sealing surface 16 bears against a corresponding surface 17 on the flap 5.

Figure 8:
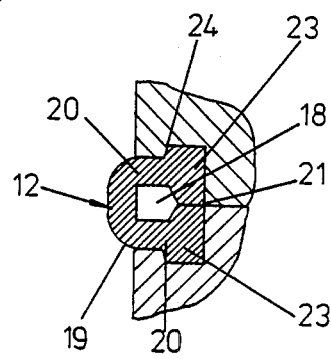
FIG. 8 is a cross-sectional view of the seal shown in FIG. 7, mounted in the casing, shown only in part.

The arcuate seal members 14, as shown in FIGS. 2 and 8, when mounted in the tee-slot 11, form a closed hollow space 18. The closed hollow space 18 extends in the arcuate direction of the seal members 14, that is, in the circumferential direction around the axis of the opening 3. On its radially inner side, note FIG. 8, the hollow space 18 is defined by a curved seal part 19 with the remainder of the hollow space being enclosed by two webs 20, extending radially outwardly from the sealed part 19. The radially outer ends of the webs 20 have inwardly directed sections which close the outer part of the hollow space and form contact surfaces 21 which engage one another. When the two casing parts 1a, 1b are connected together by the bolts 30, the contact surfaces 21 are pressed under a given pre-stress against one another so that a sealed hollow space 18 is formed within the seal 12. In addition, the contact surfaces 21 can be adhesively attached to one another to assure the closed or sealed hollow space 18.

Figure 7:
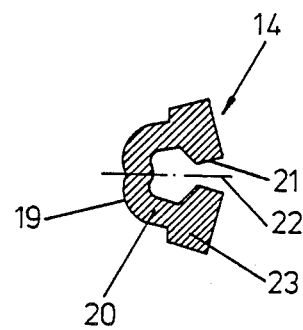
FIG. 7 is a cross-sectional view on an enlarged scale taken along the line VII—VII in FIG. 5, before the seal is mounted in the valve casing.

In FIG. 7, the cross-section of the seal members 14 is shown as produced in a pressing method within a mold. Before being introduced into the tee-slot 11, the two webs 20 of the seal 12 are in diverging relation relative to one another in the radial direction outwardly from the seal part 19. Accordingly, in the as produced condition, the seal 12 has a slot 22 between the contact surfaces 21. This arrangement of the seal 12 makes it possible to remove it from the mold where it is produced in the pressing method.

At the radially outer ends of the webs 20, projections 23 extend in the opposite direction from the portions of the webs forming the contact surfaces 21 and extend in the circumferential direction. Projections 23 seat into correspondingly shaped recesses 24 formed in the annular tee-slot 11 so that the seal 12 is retained in the radial direction. In the arrangement of the casing parts 1a, 1b, shown in FIGS. 2 and 8, where the casing parts fit tightly against one another, the seal 12 is secured under axial pressure in the recesses 24, whereby the two casing parts are sealed to the outside. The curved seal part 19 projects radially inwardly from the casing parts 1a, 1b into the opening 3 formed by the casing. When the flap 5 is moved to the closed position, the seal 12 is deformed. With the flap in the closed position, air in the closed hollow space 18 is compressed and the air cushion formed within the space renders an easier closing action, and at the same time the sealing effect is improved. A harder material, resistant to wear, can be used for the seal. Nevertheless, during the closing of the flap within the valve, a slight torsion moment is necessary affording a good sealing effect.

Almost all of the parts of the valve, especially the casing, the covering of the flap, which contact the medium flowing through the valve, and the bushings are made of a synthetic plastics material, such as polyvinyl chloride or polypropylene. As a result, the flap valve of the present invention can be used for aggressive mediums, such as acids and alkaline solutions.

By using a metallic core within the flap 5, the flap can be used in larger diameter valves, that is, valves with an opening diameter greater than 100 mm where high forces act upon the closure flap.

While specific embodiments of the invention have been shown and described in detail to illustrate the application of the inventive principles, it will be understood that the invention may be embodied otherwise without departing from such principles.

I claim:

1. Flap valve comprising an annular casing forming an opening having an axis for passage of a fluid through the valve, a flap mounted in the opening in said casing and being pivotally displaceable about a pivot axis extending across the opening between a closed position preventing flow through the opening and open positions permitting flow through the opening, said casing comprising at least two annular casing parts in contacting engagement and having a plane of contact therebetween extending transversely of the opening axis, said casing parts forming in combination a circumferentially extending annular tee-slot, an annular seal mounted in said tee-slot and projecting radially inwardly into and extending circumferentially around the opening formed by the casing, said seal comprising a pair of rings disposed in spaced relation and each ring being concentric to the pivot axis, and said rings being interconnected by seal members attached to and extending in the circumferential direction of said opening between said rings, and said seal members each having a closed hollow space extending in the circumferential direction between said rings.

2. Flap valve, as set forth in claim 1, wherein each said seal member comprises a seal part with an outside curved surface, and a pair of webs connected to said seal part and projecting radially outwardly therefrom and disposed in laterally spaced relation, the radially outer ends of said webs extending in the axial direction of the opening toward one another and said outer ends forming contact surfaces.

3. Flap valve, as set forth in claim 2, wherein said contact surfaces contact one another and are pre-stressed when the casing parts are interconnected with the seal located within said tee-slot.

4. Flap valve, as set forth in claim 2, wherein said contact surfaces are adhesively connected together.

5. Flap valve, as set forth in claim 2, wherein said webs of said seal members have projections extending in the axial direction and extending outwardly from said webs in the opposite direction relative to said contact surfaces, and said projections being disposed in recesses formed by said tee-slot.

6. Flap valve, as set forth in claim 2, wherein said curved surfaces of said seal parts extend circumferentially of and inwardly of the opening formed by said casing.

7. Flap valve, as set forth in claim 1 wherein said flap includes a metallic core enclosed within and covered by a covering of synthetic plastics material.

8. Flap valve, as set forth in claim 7, wherein said cover is formed of two shell-shaped parts, each formed of a synthetic plastics material and said shell-shaped parts being welded together.

9. Flap valve, as set forth in claim 8, wherein at least one welding seam welds said shell-shaped parts together and said at least one welding seam is located in a plane containing the pivot axis and in the closed position of the flap the plane of the welding seam extends transversely of the plane of contact of said casing parts.

10. Flap valve, as set forth in claim 8, wherein at least one welding seam welds said shell-shaped parts together and said at least one welding seam is located in a plane offset laterally from the pivot axis and the plane of said welding seam extends parallel to and spaced from the plane of contact of said casing parts when said flap is in the closed position.

11. Flap valve, as set forth in claim 7, wherein said pivot axis is formed by a pair of axially extending metallic shaft pieces each connected to said flap at a diametrically opposite side thereof with said shaft pieces being in threaded engagement with the metallic core of said flap.

12. Flap valve, as set forth in claim 1, wherein the plane of contact of said casing parts includes the pivot axis of said flap.

* * * * *